United States Patent
Zanni et al.

(10) Patent No.: US 7,879,141 B2
(45) Date of Patent: Feb. 1, 2011

(54) GAS FLOW ABSORBER

(75) Inventors: Giovanni Zanni, Grosseto (IT); Oscar R. L. De Groen, Grosseto (IT)

(73) Assignee: IGS Italia S.R.L., Grosseto (IT)

( * ) Notice: Subject to any disclaimer, the term of this patent is extended or adjusted under 35 U.S.C. 154(b) by 224 days.

(21) Appl. No.: 12/080,243

(22) Filed: Apr. 1, 2008

(65) Prior Publication Data

US 2009/0107341 A1 Apr. 30, 2009

(30) Foreign Application Priority Data

Oct. 25, 2007 (IT) .......................... MI2007A2059

(51) Int. Cl.
*B01D 53/02* (2006.01)

(52) U.S. Cl. .......................... 96/134; 55/511
(58) Field of Classification Search .................... 96/108, 96/134, 139, 151; 422/176, 177, 190, 191, 422/211, 212; 55/511; 210/282, 502.1
See application file for complete search history.

(56) References Cited

U.S. PATENT DOCUMENTS

| | | | | |
|---|---|---|---|---|
| 3,434,599 A | * | 3/1969 | Hoffman et al. | 210/266 |
| 3,464,186 A | * | 9/1969 | Walker et al. | 96/115 |
| 3,529,726 A | * | 9/1970 | Keenan | 210/232 |
| 4,303,422 A | * | 12/1981 | Persinger | 96/135 |
| 4,396,206 A | * | 8/1983 | Tsuge et al. | 280/6.157 |
| 4,801,313 A | * | 1/1989 | Mann | 96/126 |
| 5,110,330 A | * | 5/1992 | Loughran | 96/117.5 |
| 5,288,469 A | * | 2/1994 | Skalla | 422/171 |
| 5,545,242 A | * | 8/1996 | Whitlock et al. | 55/502 |
| 5,620,507 A | * | 4/1997 | Oborne et al. | 96/149 |
| 5,891,223 A | * | 4/1999 | Shaw et al. | 96/134 |
| 6,638,348 B2 | * | 10/2003 | Kuriiwa et al. | 96/146 |
| 6,863,714 B2 | * | 3/2005 | De Biasio | 96/132 |
| 2007/0113739 A1 | * | 5/2007 | Porter | 96/134 |

* cited by examiner

*Primary Examiner*—Frank M Lawrence
(74) *Attorney, Agent, or Firm*—Kirschstein, et al.

(57) ABSTRACT

A gas flow absorber comprises an absorption vessel, having a vessel wall defining a cylinder including an absorption material, the cylinder having a cylinder wall bearing, at the bottom thereof, in a circumferential slot formed on a support plate including a channel therethrough a gas mixture flow is conveyed, the channel having a channel hole passing through an enlarged portion of the support plate, the enlarged portion being coupled to a flat chamber substantially extending through the overall extension of the vessel bottom, the chamber being covered by a disc-like body made of a sintered material.

10 Claims, 2 Drawing Sheets

GAS FLOW ABSORBER

BACKGROUND OF THE INVENTION

The present invention relates to a gas flow absorber, therethrough gas flows, in particular gas mixture flows are conveyed.

Absorbers operating based on the Pressure Swing Adsorption (P.S.A.) system are already known in the prior art, in which is also known that a fluidization of the inner bed of prior absorbers must be absolutely always prevented, by properly controlling the maximum rate of the fluid conveyed through the absorber device bed.

Said prior absorbers, conventionally comprises further diffusers arranged at the bottom and top of the absorber vessel, for allowing the absorber inlet fluid, such as oxygen or nitrogen or air mixtures, to expand in the absorber. To that end, prior absorber vessels have a diameter larger than the cross section of the gas inlet or outlet tubes. Thus, as a gas or fluid enters the absorber vessel, the rate with which said gas or fluid passes through the absorber material, usually comprising carbon or zeolites molecular sieves, decreases.

The above mentioned diffusers are usually made of thin metal perforated plates, in combination with metal layers having a different mesh size.

In particular, the mesh size substantially depends on the size of the bodies or particles used as an absorption material.

A further fluid diffusion system provides to use catalytic devices arranged within the absorber bed.

Such prior system, however, has the drawback that the gas flow fluid through the absorber is rather uneven, and, moreover, requires a comparatively long time for passing through the absorber vessel, thereby dead spaces are undesirably formed in the absorber vessel.

Moreover, the last approach has the drawback that the absorber volume has a comparatively large absorber volume dead part, for providing a required space at the gas or fluid inlet on the bottom of the absorber, as well as at the absorber top, where the outlet ports are formed.

In addition, said diffusion plates require to use a metal perforated disc to be arranged between the absorber outlet and inlet tubes, to prevent the fluid passing through the central portion of the diffuser from achieving excessively high diffusion rates.

Thus, the required additional dead space greatly increases the air or other gas contents in the stream or flow to be processed.

Furthermore, the making cost, weight and geometrical volume of the mentioned prior absorbers are also greatly increased.

In absorbers processing non dangerous fluids, such as air, hydrogen or the like mixtures, it is also known to use the so-called "cocomat" discs, or balls made of a ceramics or the like material, which balls are arranged between the diffusers and absorption material, to reduce to a minimum the dead space and further optimize the fluid flow diffusion within the absorber vessel.

In this connection, it should be pointed out that the above mentioned methods have the further drawback that they are not compatible with all the types of fluid passing through the absorption material, for example oxygen.

Moreover, they are not suitable to carry out very sophisticated procedures, requiring a very high refining degree.

Yet another drawback of prior plate diffusers is that the fluid flow passes through the absorption material bed in an uneven manner and, moreover, the absorption material and diffuser costs are very high.

SUMMARY OF THE INVENTION

Accordingly, the aim of the present invention is to overcome the above mentioned drawbacks of the prior art, by providing a simple gas flow absorber having an absorber vessel, the wall of which defines a cylinder including an absorption material, the cylinder wall bearing, at the bottom thereof, on a circumferential slot formed on a support plate, said support plate having a channel therethrough a gas mixture flow may pass, said chamber including a hole communicating with an enlarged portion provided in the support plate, which enlarged portion is coupled to a flat chamber extending substantially through the overall extension of the vessel bottom, said chamber being covered by a disc body made of a sintered material.

Advantageously, the material forming the disc body comprises sintered brass, or sintered stainless steel.

BRIEF DESCRIPTION OF THE DRAWINGS

The subject matter of the present invention will be disclosed in a more detailed manner hereinafter with reference to the accompanying drawings, where.

DESCRIPTION OF THE PREFERRED EMBODIMENTS

Figure 1:
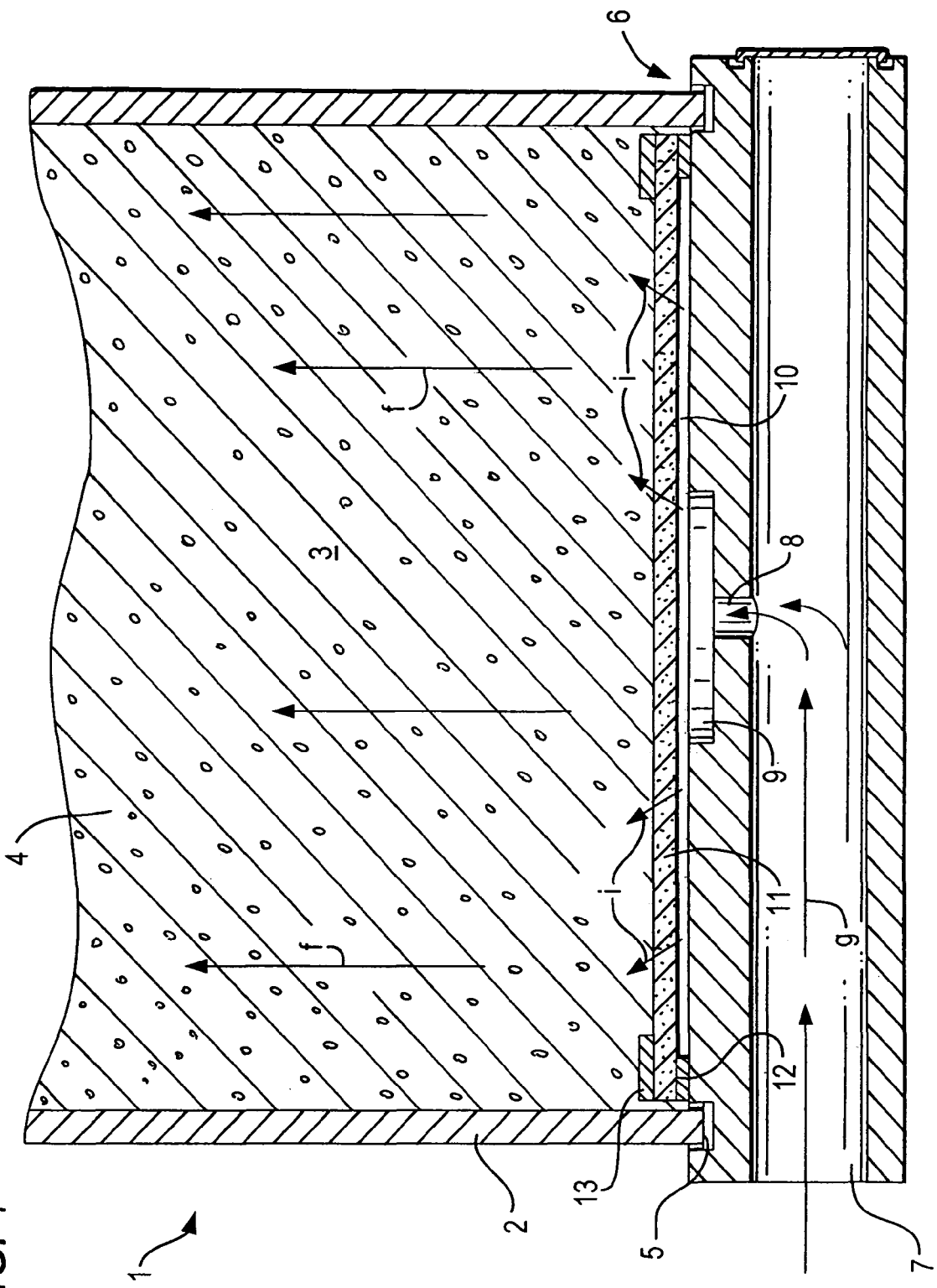
FIG. 1 is a cross-sectional view showing a bottom portion of the absorber vessel.

As shown in FIG. 1, the absorber vessel, generally indicated by 1, comprises an absorber vessel wall 2 defining a cylinder, which, in its inner chamber or space 3, includes an absorption or absorbing material 4, shown by horizontal dashed lines.

In particular, through said absorption material, a gas mixture flow, indicated by the arrows (f) is caused to pass.

At the bottom thereof, the cylindric wall 2 bears on a circumferential slot 5 of a supporting plate, generally indicated by 6.

The supporting plate 6 comprises a supporting plate channel 7 therethrough, as shown by the arrows (g), is conveyed a gas mixture flow, to be supplied through a supplying or feeding hole 8, to the inside of the cylindric vessel 2. As shown, the hole 8 communicates with an enlarged portion 9 formed in the plate 6 and being coupled with a flat chamber 10 substantially extending through the overall extension of the bottom of the vessel 1.

The chamber 10 is covered by a disc body, indicated by the reference number 11, said disc body 11 being made of a sintered material, such as sintered brass or sintered stainless steel.

Thus, owing to the provision of the disc 11 made of a sintered material, it is possible to define with a very great accuracy the porosity of the disc 11, thereby fitting it to the characteristics of the conveyed fluids.

In particular, the fluids conveyed to the chamber 10 pass through the overall extension of the disc 11, as indicated by the arrows (i) in FIG. 1.

Moreover, owing to the provision of a spacer ring element 12 and a further locking ring element 13, the sintered material disc 11 is locked in its desired position.

By removing the ring element 13, on the other hand, the filtered material disc 11 can be replaced by a further disc having modified technical characteristics.

Figure 2:
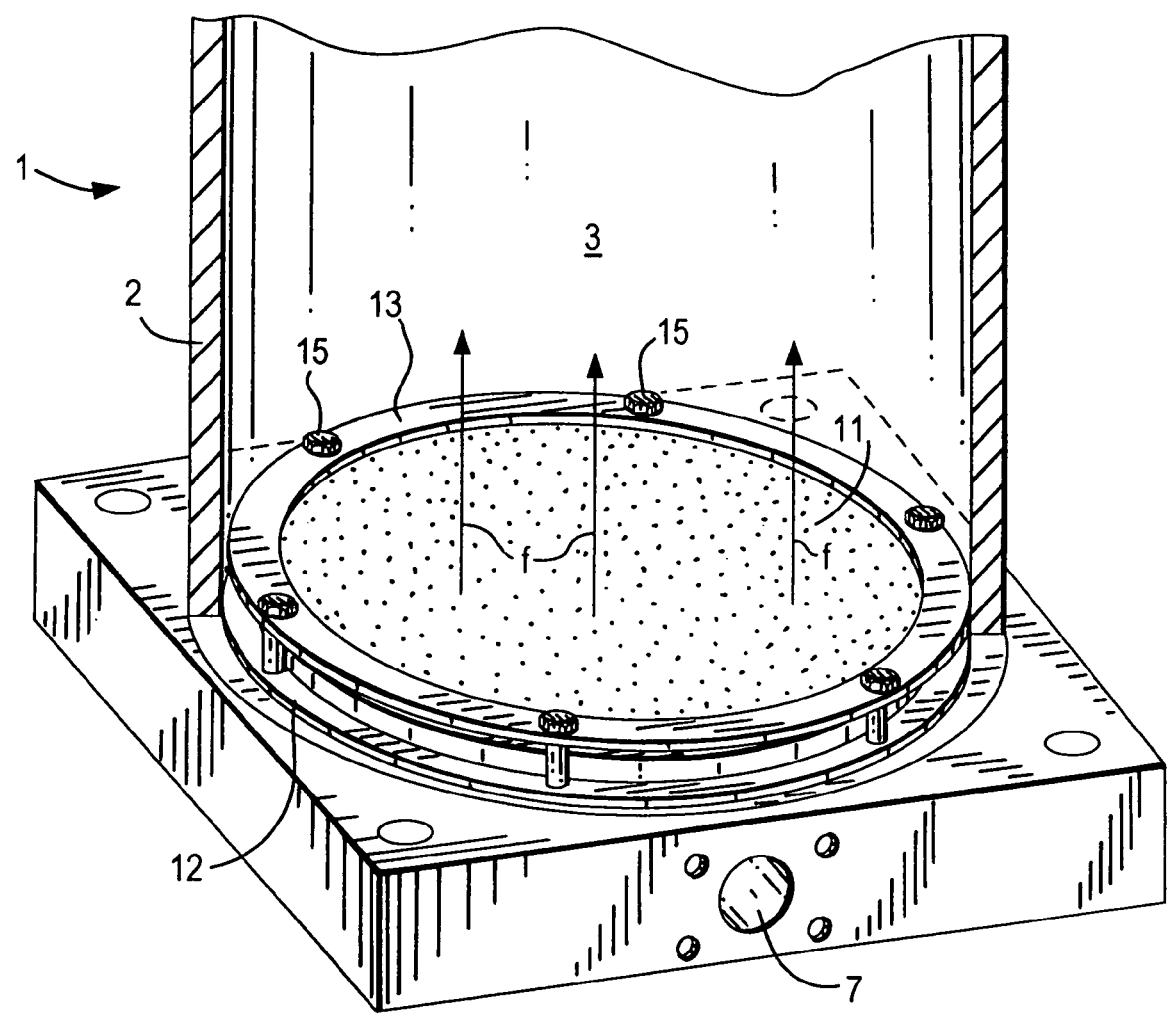
FIG. 2 shows, partially in cross-section and partially in a perspective view, the bottom portion of the absorber vessel.

FIG. 2 is a partially cross-sectioned perspective view showing the cylinder 1 of the subject absorber device, and, in this view, for clearness reasons, the absorption material 3 has been omitted.

It is clearly possible to see therein the inlet port of the duct 7, the spacer element 12, and locking ring element 13 to lock on said spacer element 12 the sintered material disc 11.

Thus, due to the locking of the disc 11 by the locking ring 13 and a plurality of clamping screws 15, it is possible to held the sintered material disc 11 at its set position and, moreover, by screwing off the screws 15 it is possible to remove the locking ring element 13, and, accordingly, the sintered material disc 11 to be replaced.

The above replacement must be performed as the sintered material disc 11 is clogged by particles entrained in the gas mixture flow, or as it is necessary to use a disc 11 having different technical characteristic.

The support plate, and the material used for forming the cylinder 1 is advantageously made of aluminium, thereby the absorber 1 will have an overall light weight, while providing the required mechanical function to allow the absorber to operate in a continuous manner.

The invention claimed is:

1. A gas absorber assembly, comprising:
    a support having an inlet for admitting a gaseous mixture, support walls bounding an interior channel through which the gaseous mixture flows, and an outlet for discharging the gaseous mixture from the channel;
    a vessel mounted on the support and having an interior that contains a gas absorbing material;
    a spacer element mounted in the vessel on one of the support walls of the support;
    a porous disc constituted of a sintered material and mounted in the vessel on the spacer element, the disc being spaced from and bounding a chamber with the one support wall, the chamber being free of the gas absorbing material and being in gaseous flow communication with the outlet for receiving the discharged gaseous mixture, the disc having pores through which the discharged gaseous mixture from the chamber flows to the gas absorbing material in the vessel;
    a holding element mounted in the vessel on the disc to hold the disc in position on the spacer element during gas absorption; and
    a lock for removably locking the disc on the spacer element to enable removal of the disc.

2. The gas absorber assembly of claim 1, wherein the one support wall has a circular slot, and wherein the vessel has a cylindrical wall mounted in the circular slot.

3. The gas absorber assembly of claim 1, wherein the support has a rectangular, box-like shape.

4. The gas absorber assembly of claim 1, wherein the support and the vessel are both constituted of aluminum.

5. The gas absorber assembly of claim 1, wherein the outlet extends centrally through the one support wall and includes a hole having a hole cross-section, and an enlarged bore having a bore cross-section that is larger than the hole cross-section; and wherein the chamber has a chamber cross-section that is larger than the bore cross-section.

6. The gas absorber assembly of claim 1, wherein the sintered material is brass.

7. The gas absorber assembly of claim 1, wherein the sintered material is stainless steel.

8. The gas absorber assembly of claim 1, wherein the disc has a circular shape and a circular periphery, and wherein the spacer element and the holding element are circular rings extending around the circular periphery of the disc.

9. The gas absorber assembly of claim 1, wherein the disc has a periphery, and wherein the spacer element and the holding element extend around the periphery of the disc; and wherein the lock includes a plurality of fasteners spaced around the periphery of the disc.

10. The gas absorber assembly of claim 9, wherein the fasteners are spaced equiangularly around the periphery of the disc.

* * * * *